United States Patent [19]

Flipeaux

[11] Patent Number: 5,671,268
[45] Date of Patent: Sep. 23, 1997

[54] TELEPHONE ANSWERING MACHINE

[75] Inventor: Jean-Luc Flipeaux, Bry sur Marne, France

[73] Assignee: France Telecom, Paris, France

[21] Appl. No.: 422,543

[22] Filed: Apr. 12, 1995

[30] Foreign Application Priority Data

Apr. 12, 1994 [FR] France ................... 94 04319

[51] Int. Cl.$^6$ ................................. H04M 1/64
[52] U.S. Cl. ................. 379/68; 379/67; 379/74; 379/77
[58] Field of Search .................. 379/67, 68, 71, 379/72, 74, 75, 76, 77, 79, 87, 88, 89

[56] References Cited

U.S. PATENT DOCUMENTS

| 4,122,306 | 10/1978 | Friedman et al. | 379/73 |
| 4,571,458 | 2/1986 | Bond | 379/77 |
| 4,588,857 | 5/1986 | Arsem | 379/76 |
| 4,783,800 | 11/1988 | Levine | 379/67 |
| 4,847,889 | 7/1989 | Eswaran | 379/67 |

FOREIGN PATENT DOCUMENTS

| 0 567 135 | 10/1993 | European Pat. Off. . |
| 93/20640 | 10/1993 | WIPO . |

Primary Examiner—Krista M. Zele
Assistant Examiner—Scott L. Weaver
Attorney, Agent, or Firm—Pollock, Vande Sande & Priddy

[57] ABSTRACT

A telephone answering machine includes at least two tapes, the first of which records a subscriber's outgoing universal message (OGM) to all callers. A second of the two tapes records incoming messages from callers. A control device detects a tone code defined by, and entered by, a caller in conjunction with recording one of the messages as a message from the caller. The second tape is rewound and plays back the recorded caller's message to the subscriber. The subscriber can then re-enter the same code and record a response to the recorded caller's message on the first tape. The control device detects the code being re-entered by the caller if the caller has called again, in search of the response recorded by the subscriber, which corresponds to the re-entered code. The control device further searches for the re-entered code on the first tape in conjunction with the response recorded by the subscriber in response to the caller having re-entered the code. Thereafter, there is selective playback to the caller of only the response recorded by the subscriber which corresponds to the re-entered code.

15 Claims, 1 Drawing Sheet

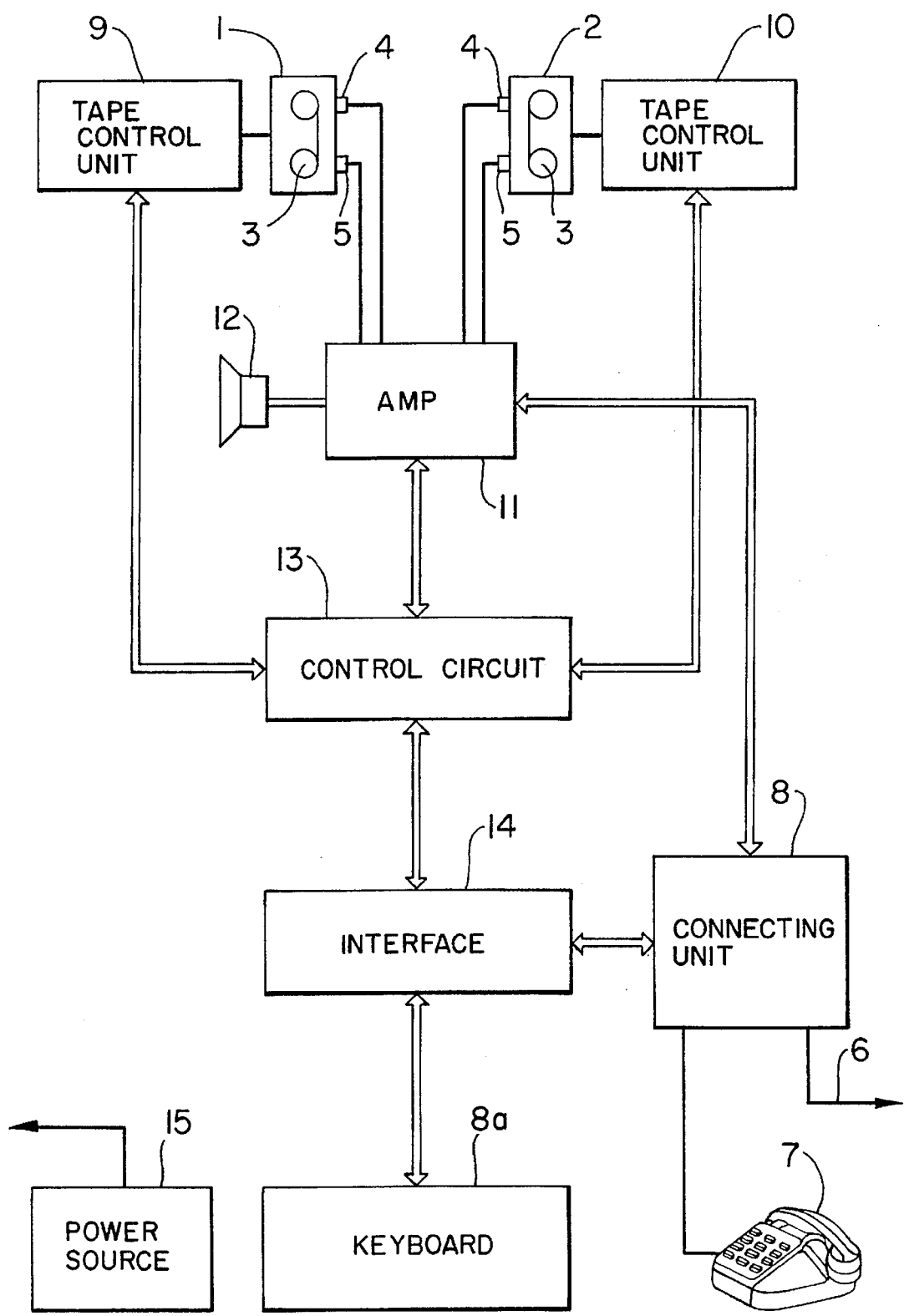

TELEPHONE ANSWERING MACHINE

FIELD OF THE INVENTION

The present invention relates to a telephone answering machine permitting the user to record messages for the sole attention of specific callers who have previously satisfied an identification procedure.

BACKGROUND OF THE INVENTION

Answering machines are already known which usually comprise one, or more frequently two, magnetic tape cassette players, on one tape of which the proprietor of the telephone line has recorded one or several messages selecting the one which is to be heard by all callers to the subscriber's station in his absence, the subscriber having previously switched on his answering machine, and on the other tape which is available after the message has been listened to, the caller can record a message for the subscriber after hearing a tone which indicates that the machine is ready to record.

The machine is designed so that at the end of the recorded message it returns to its initial state after rewinding the first tape which is set so that a new caller is able to listen to the message.

The message which the caller may wish to record on the second tape comes after the first, so that the subscriber on returning to his station can listen to all the recorded messages in sequence before erasing this tape if necessary, the apparatus being ready for use when the proprietor of the line puts it into service again.

These typical devices are frequently used and very useful, and may even comprise various improvements permitting a selective recording or erasing of the messages depending on whether it is necessary to record the messages received or not, or to combine the device with means for the subscriber to listen by remote control following the transmission of a code suitable therefor, or possibly even with line forwarding according to the usual functions of current telephone installations.

However, they do not permit the subscriber to communicate to a given caller a personalized response which naturally must not be heard by other callers, the recording of this response, which normally would have to be made on the first tape reserved for the subscriber's messages since only the latter is adapted to be listened to by the caller, not being permitted by a typical machine. In certain cases the proprietor of the line who checks his answering machine on site or by remote control does not know or cannot call back the person who has left the message either because the latter does not have a line where it would be possible to contact him or is away on business, although a response could meanwhile be urgent.

BRIEF DESCRIPTION OF THE INVENTION

The subject of the invention is a telephone answering machine which permits a subscriber to record messages locally or by remote control in the form of a particular response for the attention of a person who has previously called the station and has formulated an identification code such that the subscriber on recording this response accompanied by a repetition of the code thus formed permits the person who calls back later to listen to the message intended for him to the exclusion of every other caller, who does not know and is unable to form the same code.

To this effect, the said device, comprising an answering machine linked to a calling station connected to the telephone line of a subscriber having one or preferably two magnetic tape cassette players from which respectively, on the one hand messages from the subscriber are relayed to all callers to the station, the subscriber having left the answering machine switched on, and on the other hand messages left by successive callers are recorded which are suitable to be passed on to the subscriber locally or by remote control after the tape has been wound back and listened to. The assembly is controlled by a keyboard at voice frequencies and by a control unit which according to the functional modes selected initiates the start up, the regulation of speed and the control of the cassette recorders for listening to messages. The recording or playing of messages and a unit for connecting to the telephone line, is characterized in that the control unit comprises means capable of recognizing a predetermined code in a message from a caller recorded on the tape of one of the cassette players which corresponds to a sequence of figures introduced by this caller in his message, preferably at the beginning thereof, to locate the said sequence when it has then been inserted in the same way by the subscriber on the message tape, after he has played the recorded message, and if he wishes to prepare a personalized response for the caller and to relay this response to the caller from the tape of subscriber's messages, when said caller calls back, in which the latter again formulates the predetermined identification code when connected to the line while listening to the message.

Preferably, the code predetermined by the caller comprises a series of voice frequencies issued from a keyboard of the apparatus used by the caller functioning in DTMF mode (Dual Tone Modulation Frequency).

It is also preferable in order to avoid any error in the identification of the predetermined code if the series of voice frequencies comprises specific reference points at the beginning and end of the code.

According to one particular characteristic, the device also comprises a separate indicator suitable for informing the user that there is a recorded message comprising a predetermined code.

According to a further characteristic, the device comprises means suitable for erasing the predetermined code at the same time as erasing the recorded message reserved for the caller following the formation of this code.

Other characteristics of an answering machine improved by the invention will be mentioned throughout the following description of an unrestricted embodiment shown by way of example with reference to the appended drawing.

BRIEF DESCRIPTION OF THE FIGURE

The figure is a block diagram of an installation in accordance with the invention.

DETAILED DESCRIPTION OF THE INVENTION

In the Figure which illustrates the assembly of a telephone answering machine according to the invention, reference marks 1 and 2 indicate respectively two magnetic tape (3) cassette players, each player being provided in a manner known in the art with a replay head 4 and an erase head 5.

Player 1 is reserved for recording one and if necessary several distinct messages by the subscriber, the proprietor of the telephone line, indicated in the drawing by reference number 6, which is connected to a calling and answering station 7 by means of a typical connecting unit 8. The message selected by the subscriber from a control keyboard 8a is to be listened to by all external callers having dialed the subscriber's telephone number, especially, when the latter has to be absent and has set his answering machine ready to receive any calls which may be made in his absence.

Player 2 is reserved for recording the messages that each caller may wish to leave for the subscriber he has called, after listening to the message supplied by player 1, the corresponding tape winding forward after emitting a tone informing the caller that he may leave a message which the subscriber can then listen to, when on his return he disconnects the tape containing his message and listens to the tape of messages left for him.

The electronic units 9 and 10 respectively are connected to players 1 and 2 in order to separately control the rewinding or winding forward of their tape 3 while regulating the drive speed of these tapes and controlling when they start or stop.

Players 1 and 2 are otherwise connected in parallel to an amplifying circuit 11 which is itself connected to a loudspeaker 12 permitting the subscriber either to listen to the tape to control the content of his recorded messages thereon or to listen to the messages and information from successive callers who have left their own messages on the other tape, which are in the order in which they have been recorded.

The amplifier 11 is connected to a connecting unit 8 and to a control circuit 13 programmed and controlled by means of a keyboard 8a and an interface circuit 14 such that according to the listening sequences of the messages or the recording of messages, one or other of the tapes 3 of players 1 or 2 are controlled in the correct direction rewinding or winding forward. The reference number 15 indicates a feeder circuit providing the apparatus with the different voltages required.

In an telephone answering machine of this type known in the art, it is not possible for the subscriber having received a message from a given caller to record a response on his apparatus which is exclusively intended for this caller and also not be heard by any third person interrupting on his line.

In fact, only the tape of messages left by the subscriber enables the latter to record a message which can then be listened to by any caller to the line and activates the answering machine.

The present invention relates to an improvement to an electronic control circuit 13 of a typical answering machine making it possible for a particular response to be recorded on the tape of messages intended for a particular caller and to do this in such a way that the latter on recalling the line can listen to the response of the subscriber which the latter will have recorded in the meantime for the sole benefit of the said caller and for no other person meanwhile calling through on the same line.

To this aim the caller joining the line of the subscriber, who has previously switched on the answering machine, having listened to the message relayed by the device for the attention of every caller is invited to record his own message on the other tape after waiting for a tone indicating that the second tape is ready to receive this message.

Then at voice frequencies, the caller formulates a predetermined code on his own keyboard which he selects as desired and which is then consequently recorded on the second tape of the answering machine.

Preferably, the caller records this code before his own message. Furthermore, this code is preferably preceded by identification markers corresponding, for example, to a signal issued by pressing a particular key of the keyboard such as the "asterisk" key, the actual code comprising a series of figures (in the order of 4 or 5 figures depending on the case) ending with a different marker, corresponding again to a specific key of the keyboard, for example the key "hash".

The caller then records his message and hangs up.

When the subscriber, having returned and disconnected his answering machine to listen to the recorded messages, listens to the message of the caller, he identifies the message left by the latter notably by remembering the sequence of figures chosen by the caller.

If the subscriber wishes at this point to leave a particular message for the caller, which cannot be heard by anyone else who gets through to the answering machine when it is switched on again, he need only make a recording on the tape of messages, the tape having been wound far enough to locate a blank available space.

Then the subscriber first records the caller's code onto the tape using his own keyboard at voice frequencies marking the beginning and the end of the sequence of figures of the code with the aforementioned symbols asterisk and hash. After this, the subscriber relays his message recorded on tape up to the point where the latter is stopped then rewound for the chosen message to be listened to again by any subsequent caller.

When the caller calls back to the subscriber's line he listens again to the message relayed by the answering machine. However, if at this point he formulates the predetermined code chosen by himself he instructs the tape of the message player so that the latter positions itself after this message at the place where the subscriber will have recorded the message intended for this caller alone.

On the other hand, if the subscriber has not left any particular message in the manner specified above, the answering machine will automatically go over to the second tape reserved for ordinary messages, the caller will then only be able to renew his request to be called back later by the subscriber.

The programmed control circuit permits the device on the one hand to locate the code inserted by the caller, then to compare this code to the one formed by the subscriber when the latter wishes to record a particular message of response. If the circuit determines that the two series of figures thus provided coincide, it informs the answering machine in the indicated manner, so that the caller repeating the code can listen to the response intended for him to the exclusion of every other caller.

Of course, the invention is not restricted to the specific embodiment described. Notably, all the functions of the answering machine can be operated by remote control, also for the subscriber, listening to the messages and forming a code prior to the recording of a particular response insofar as the remote control is operated from a keyboard at voice frequencies.

The erasure of messages is performed in the usual way. Illuminated indicators can be preferably provided to indicate to the subscriber the recording of a code prior to any message to which, according to the described process, a particular response can be provided. The markers provided at the beginning and at the end of the code avoid any error in the formulation thereof in its subsequent location.

I claim:

1. A telephone answering machine comprising:

at least two tapes, a first of the two tapes for recording a subscriber's outgoing universal message (OGM) to all callers and a second of the two tapes for recording callers' sequential incoming messages from callers;

control means for detecting a tone code defined by, chosen, and selectively entered by a caller in conjunction with recording one of the messages as a massage from the caller;

means for rewinding the second tape and playing back the recorded caller's message to the subscriber;

keyboard means enabling the subscriber to input the code and record a response to the recorded caller's message on the first tape along with the universal message;

the control means detecting the code being re-entered by the caller if the caller has called again in search of the response recorded by the subscriber which corresponds to the code;

the control means further searching for the code in the first tape in conjunction with the response recorded by the subscriber in response to the caller having re-entered the code; and the rewinding and playback means playing back to the caller only the response recorded by the subscriber which corresponds to the code.

2. Answering machine according to claim 1, wherein the code selectively entered by the caller comprises a series of audio frequencies issued from a keyboard means of an apparatus used by the caller functioning in DTMF mode (Dual Tone Modulation Frequency).

3. Answering machine according to claim 2, wherein audio frequencies including specific reference markers occur at the beginning and end of the code.

4. Answering machine according to claim 1, further comprising at least one separate indicator for informing the subscriber of a recorded message that includes a predetermined code.

5. Answering machine according to claim 1, further comprising means for erasing the code at a time that is the same as erasing the caller's corresponding message.

6. Answering machine according to claim 2, further comprising at least one separate indicator for informing the subscriber of a recorded message that includes a predetermined code.

7. Answering machine according to claim 3, further comprising at least one separate indicator for informing the subscriber of a recorded message that includes a predetermined code.

8. Answering machine according to claim 2, further comprising means for erasing the code at a time that is the same as erasing the caller's corresponding message.

9. Answering machine according to claim 3, further comprising means for erasing the code at a time that is the same as erasing the caller's corresponding message.

10. Answering machine according to claim 4, further comprising means for erasing the code at a time that is the same as erasing the caller's corresponding message.

11. A method for operating a telephone answering machine comprising the steps:

recording a subscriber's outgoing universal message (OGM) on a first of two tapes;

recording incoming messages from callers on a second of the two tapes;

detecting a tone code defined by, chosen, and entered by a caller in conjunction with recording one of the messages as a message from the caller;

rewinding the second tape and playing back the recorded caller's message to the subscriber;

enabling the subscriber to input the code and record a response to the recorded caller's message on the first tape along with the universal message;

detecting the code being re-entered by the caller if the caller has called again in search of the response recorded by the subscriber which corresponds to the code;

further searching for the code in the first tape in conjunction with the response recorded by the subscriber in response to the caller having re-entered the code; and playing back to the caller only the response recorded by the subscriber which corresponds to the code.

12. The method of claim 11, wherein the code is generated in DTMF (Dual Tone Modulation Frequency).

13. The method of claim 11, wherein specific reference markers of audio frequency occur at the beginning and end of the code.

14. The method of claim 11, further comprising the step of indicating to the subscriber that a message has been received from a caller that has a tone code associated with the received message.

15. The method of claim 11, further comprising the step of erasing the code at the same time as a corresponding message is erased.

\* \* \* \* \*